Aug. 22, 1933.  W. A. BARR  1,923,655
FLOW CONTROL APPARATUS
Filed July 9, 1928  6 Sheets-Sheet 1

INVENTOR.
Walter A. Barr.
BY Jesse R. Langley
ATTORNEY.

INVENTOR.
Walter A. Barr
BY Jesse R. Langley
ATTORNEY.

Aug. 22, 1933. W. A. BARR 1,923,655
FLOW CONTROL APPARATUS
Filed July 9, 1928   6 Sheets-Sheet 3
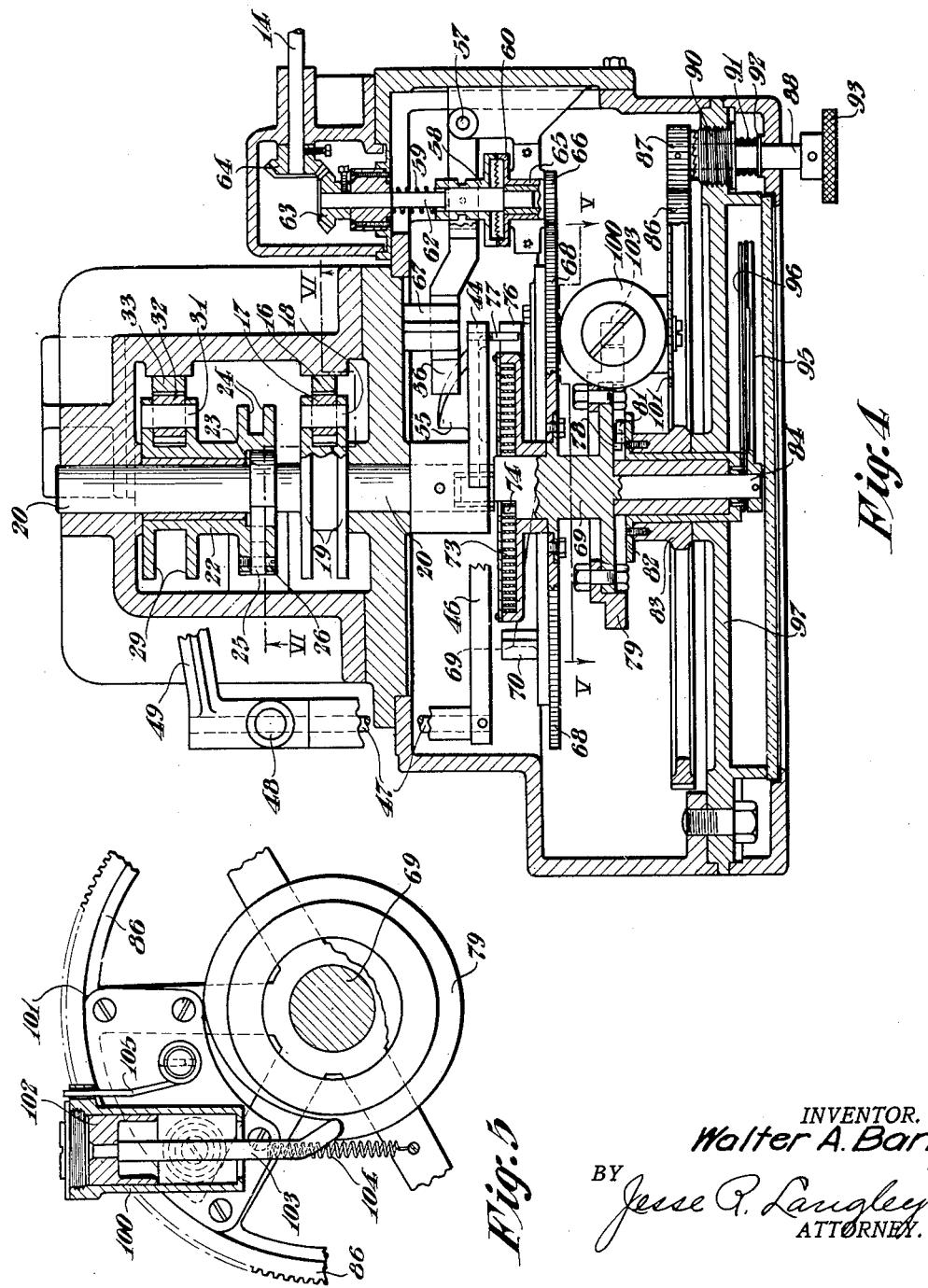
INVENTOR.
Walter A. Barr
BY Jesse R. Langley
ATTORNEY.

Aug. 22, 1933.   W. A. BARR   1,923,655
FLOW CONTROL APPARATUS
Filed July 9, 1928   6 Sheets-Sheet 4

INVENTOR.
Walter A. Barr
BY Jesse P. Langley
ATTORNEY.

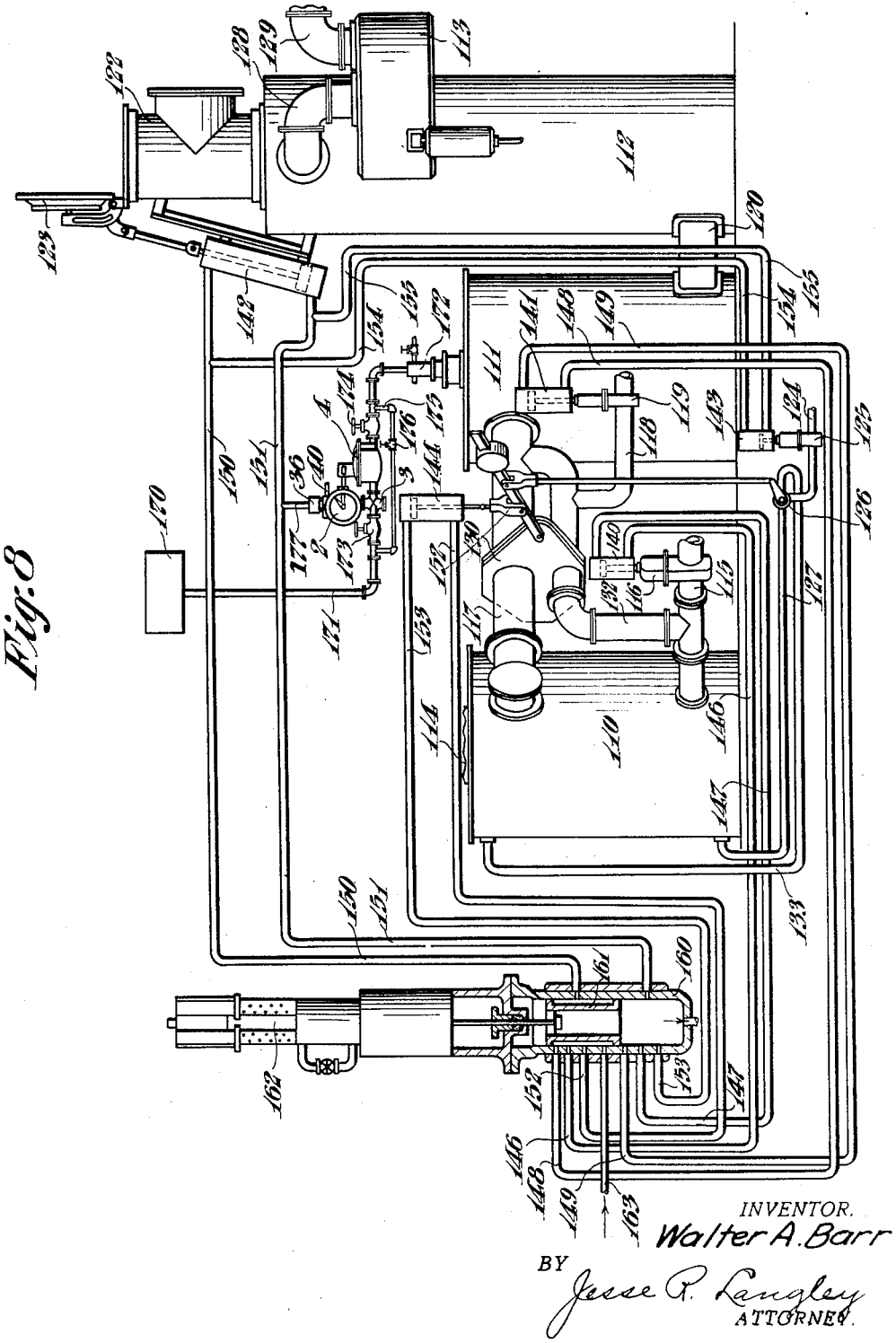

UNITED STATES PATENT OFFICE 1,923,655

FLOW CONTROL APPARATUS

Walter A. Barr, Fort Wayne, Ind., assignor to Western Gas Construction Company, a Corporation of Indiana Application July 9, 1928. Serial No. 291,309

12 Claims. (Cl. 48—83)

This invention relates to apparatus for regulating the flow of fluids through conduits, and more particularly to an apparatus for operating a valve in a fluid conduit at predetermined intervals and for closing the valve automatically when a predetermined amount of fluid has passed through the conduit.

My invention further relates to apparatus for manufacturing gas such as fuel gas and the like, as the apparatus of my invention is particularly adapted for use in connection with such apparatus, for example, a carburetted water-gas set, a scrubbing tower for removing impurities such as naphthalene from fuel gas in the course of the preparation of the gas for sale, and other installations wherein it is desired to supply a fluid intermittently to gas-manufacturing or other apparatus.

An object of my invention is to provide apparatus for so governing the flow of a fluid through a conduit that only a predetermined amount of fluid may be allowed to flow through said conduit in one operation.

A second object of my invention is to provide apparatus for so controlling a valve in a fluid conduit as to cause the valve to be opened at predetermined intervals and to close either when a predetermined amount of fluid has passed through said conduit or when a predetermined time interval or operating period has elapsed.

A further object of the present invention is to provide apparatus of the class described that shall be subject to regulation both as to the amount of fluid allowed to pass in one operation, and as to the period of time that elapses between successive operations.

A further object of my invention is to provide apparatus for intermittently supplying measured amounts of fluid to gas-manufacturing apparatus that shall be adapted to the requirements of such apparatus and the process or processes carried out therein.

A further object of my invention is to provide apparatus for automatically supplying predetermined amounts of oil or other fluid to a carburetted water-gas set, that is effective to make the operation of such set more nearly automatic than has been possible heretofore.

In addition to the general objects recited hereinabove, my invention has for its object such other operative advantages or results as may hereinafter be found to obtain.

In certain gas-manufacturing operations, it is desired to introduce or supply predetermined amounts of fluid to various parts thereof at predetermined intervals of time or at certain definite stages in the process being carried out therein.

Such devices as have heretofore been available are open to numerous disadvantages, including inaccuracy, difficulties of regulation and control, inaccessibility, lack of provisions for safety, and the like. These disadvantages are thought to be largely overcome in the apparatus of the present invention.

Moreover, the apparatus of the present invention embodies certain features not present in such devices as have heretofore been available for this purpose. For example, it will be shown hereinbelow that provision is made for either manually or automatically closing the fluid valve and shutting off the flow of fluid whenever it is desirable to do so.

My apparatus is preferably applied to a fluid conduit connected to a source of fluid supply and to a point or points to which the fluid is to be supplied, and consists briefly of a valve in the conduit for controlling the flow of fluid, a meter in the conduit, means for opening the valve that is responsive to an impulse preferably given at a predetermined interval or at a definite stage in a process or cycle of operation, means for releasing and closing the valve when a predetermined amount of fluid has been supplied, and means for inaugurating the operation of the device at predetermined or definite intervals.

Various other parts and details are provided, the natures and functions of which will be described hereinbelow.

A novel feature of my apparatus resides in the fact that the meter which serves to measure the flow of fluid is an integral part of the device and actually drives that part of the mechanism that under normal circumstances serves to close the valve and to shut off the supply of fluid after a predetermined amount is allowed to pass through the device to the point to be supplied. An advantage of this arrangement is the precision and accuracy of volume control which is thereby effected.

In order that my invention may be clearly and fully set forth and understood, I now describe with reference to the accompanying drawings, the preferred manner and form in which it is embodied.

In the drawings, which illustrate the apparatus in a particular form and embodiment, as well as certain applications thereof, Figure 1 is a front elevational view of the control apparatus;

Fig. 4 is a horizontal sectional view of the apparatus shown in Figs. 1 and 2;

Fig. 5 is a vertical sectional view of a portion of the apparatus, taken along the line V—V of Fig. 4;

Fig. 8 is a more or less diagrammatic elevational view of a carburetted water-gas set, including a device for automatically operating the same, and showing a particular application of the device of the present invention to the set.

In the drawings, similar reference numerals designate similar parts.

Figure 1:
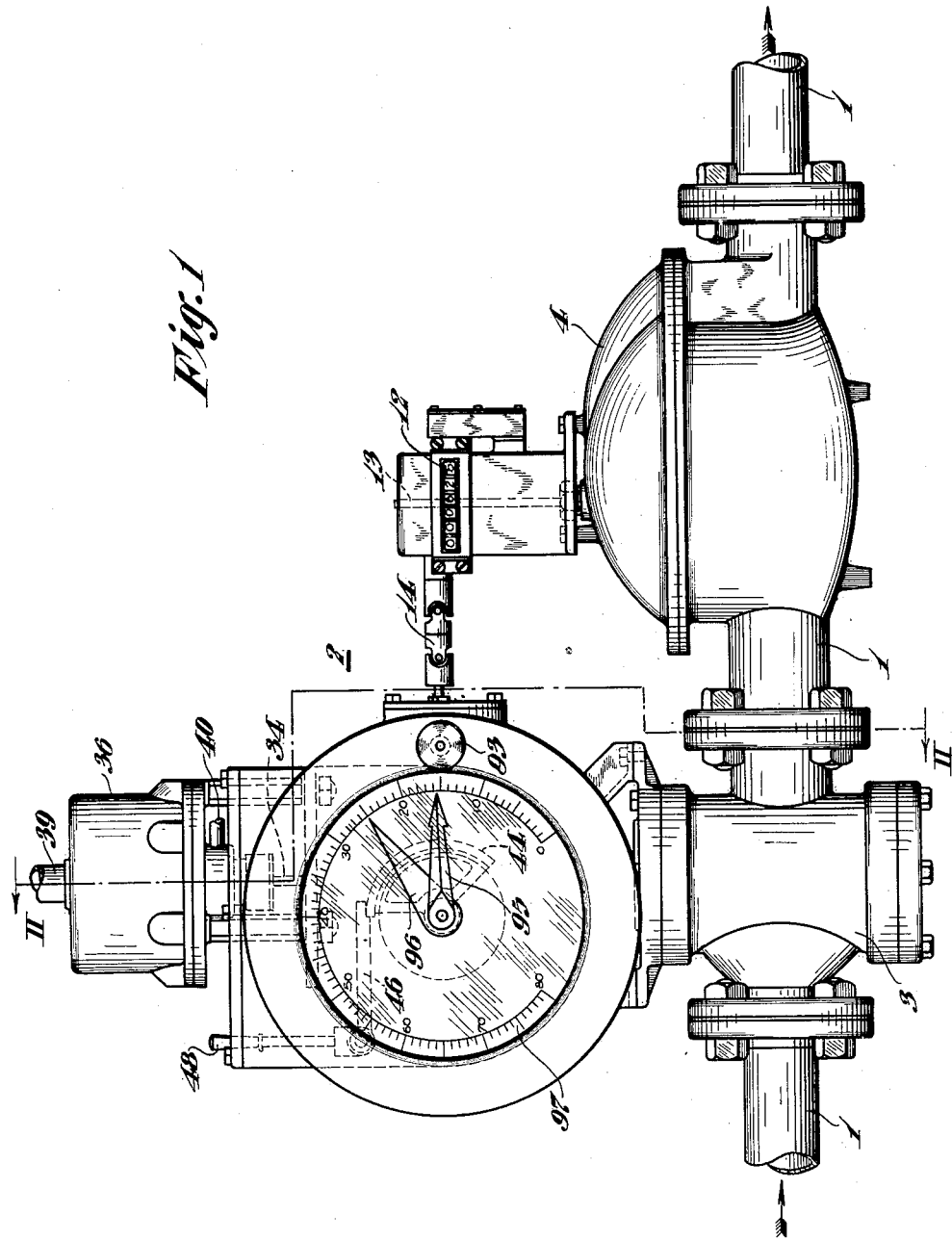
Figure 2:
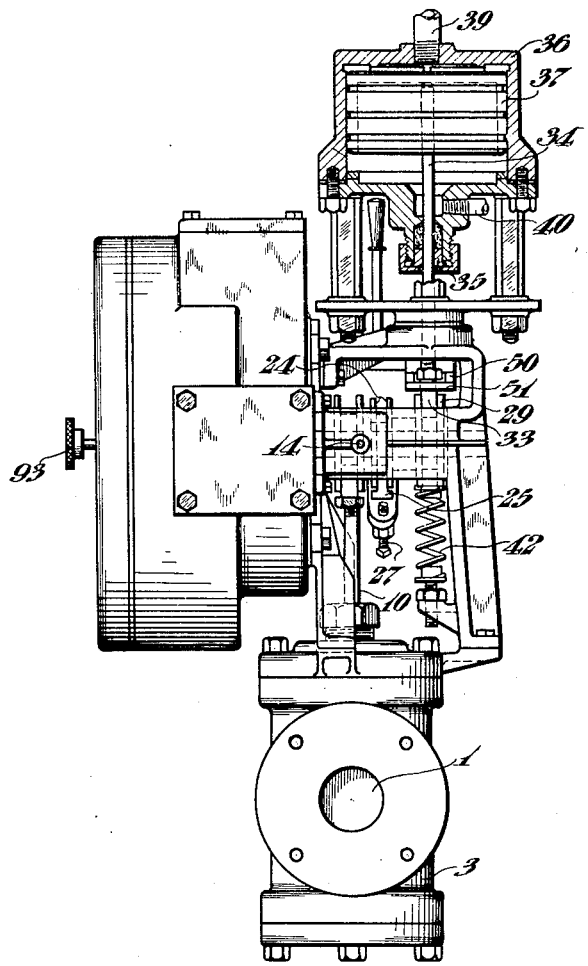
Fig. 2 is a vertical sectional view, taken on the line II—II of Fig. 1.
Figure 3:
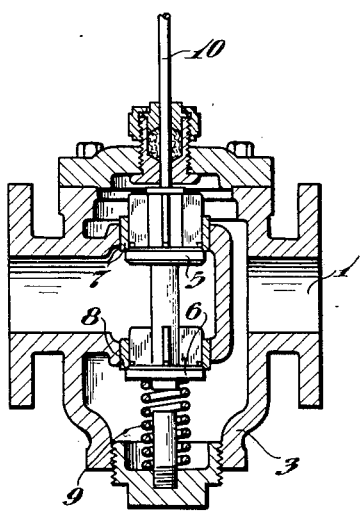
Fig. 3 is a vertical sectional view of one form of valve that may be used therewith and form a part thereof.

Referring to the drawings, and more particularly to Figs. 1, 2 and 3, a conduit 1 is provided for conveying a fluid from a source of supply such as a pump or pressure tank to a point or points to be supplied (not shown).

The flow control device of the present invention is indicated generally at 2, and is in part constituted of a valve 3 and a fluid meter 4, located in the conduit 1, preferably adjacent to each other.

The valve 3 is preferably of the balanced and quick-acting type, that is, it is so constituted that the pressure of the fluid within the conduit 1 is directed against a pair of valve discs 5 and 6 from opposite sides with reference to the corresponding valve seats 7 and 8. Such a valve may be opened easily even when the fluid pressure is very great.

The valve discs 5 and 6 are normally held in the closed position by a spring 9, and are operated by means of a stem 10. It will be apparent from the nature of the valve 3 that only a very small travel of the stem 10 and discs 5 and 6, downward from the closed position shown, is sufficient to create a passage of large area for the fluid through the valve 3.

In the present instance, the flow control device 2 is designed and intended for use in conjunction with a liquid. Accordingly, a liquid meter 4 of a standard type is illustrated.

The meter 4 is preferably provided with a counting device or register 12 for recording the total number of volume units which pass therethrough. This register 4 is located as usual on top of the body of the meter 4, and the register is operated by a shaft 13 extending into the meter 4 and connected to the rotating parts thereof.

An operative connection is also provided between the shaft 13 and a flexible shaft 14, the function of which is essential to the operation of the device and will be explained more fully hereinbelow. The shaft 14, being thus operatively connected to the rotating parts of the meter 4, rotates whenever liquid passes through the meter 4, and the amount of such rotation is proportional to the volume of liquid which traverses the conduit 1 and meter 4.

Appropriate housings and supporting members are provided for the various shafts and other members forming a part of the device 2, but as these are of secondary importance and clearly indicated in the drawings, it is unnecessary to describe the same in detail, except as necessary to indicate the natures and functions of the moving or active parts of the device 2. Such housings and supports are, however, conveniently secured to the body of the valve 3.

The valve stem 10 terminates at its upper end in a crosshead 16, that engages a block 17 in such manner that radial displacement of the block 17 causes a vertical displacement of the crosshead 16.

The block 17 is pivotally attached by means of a pin 18 to a cam housing 19 that is integrally mounted upon a shaft 20. Rotation of the shaft 20 causes the block 17 to move through a short arc and moves the cross-head 16 and stem 10 to open or close the valve 3, as the case may be.

A sleeve 22 is mounted upon the shaft 20 and is provided with an enlargement at one end thereof to accommodate a cam 23 mounted upon the shaft 20. The sleeve 22 also carries a cam housing 24, to which a pawl 25 is pivotally attached by a pin 26.

Figure 6:
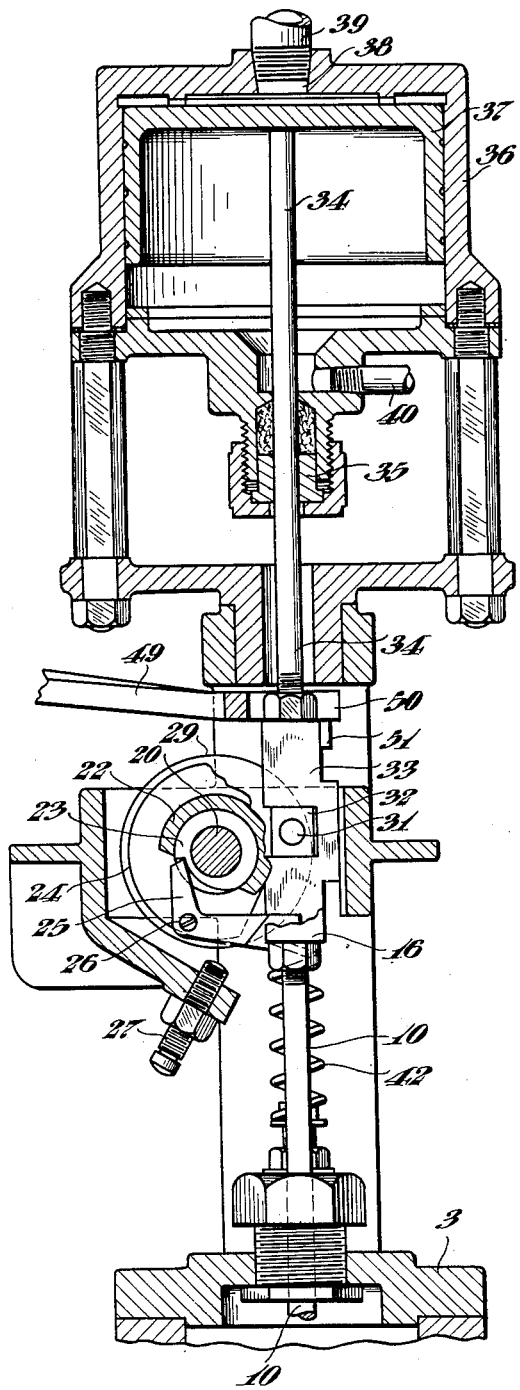
Fig. 6 is a vertical sectional view of a portion of the device, parts being broken away.

The pawl 25 ordinarily engages the cam 23 through an opening in the sleeve 22, and in the view of Fig. 6, the effect of such engagement is to cause clockwise rotation of the shaft 20 when the sleeve 22 is similarly rotated.

Such rotation is limited to an arc slightly greater than is necessary to open the valve 3 by proper setting of a set screw 27 which then engages the pawl 25. A slight further rotation of the sleeve 22 then disengages the pawl 25 and the cam 23, and breaks the temporary operative connection between the shaft 20 and the sleeve 22, permitting the shaft 20 to rotate back a short distance under action of the valve spring 9 until stopped by another device, as will be shown hereinbelow.

The sleeve 22 is also provided with a cam housing 29 that is similar externally to the cam housing 19 and carries a pin 31 and block 32 similar to pin 18 and block 17, respectively. The block 32 engages a cross-head 33, that is connected at one end to a rod 34. The rod 34 passes through a gland 35 into a cylinder 36 and engages a piston 37 slidably mounted in the cylinder 36.

The cylinder 36 is provided with a fluid pressure inlet 38 communicating through a conduit 39 with a source of intermittent fluid pressure, and with a drain 40 below the piston 37, to take care of volume changes and leakage.

When fluid pressure is not applied to the cylinder 36, the crosshead 33, rod 34 and piston 37 are held in the uppermost position by means of a spring 42 bearing against the lower face of the crosshead 33.

In such position, the valve 3 being closed, the pawl 25 engages the cam 23, and consequently a subsequent depression of the piston 37 by rotating the sleeve 22 will cause the rotation of the shaft 20 and the valve 3 will be opened.

Figure 7:
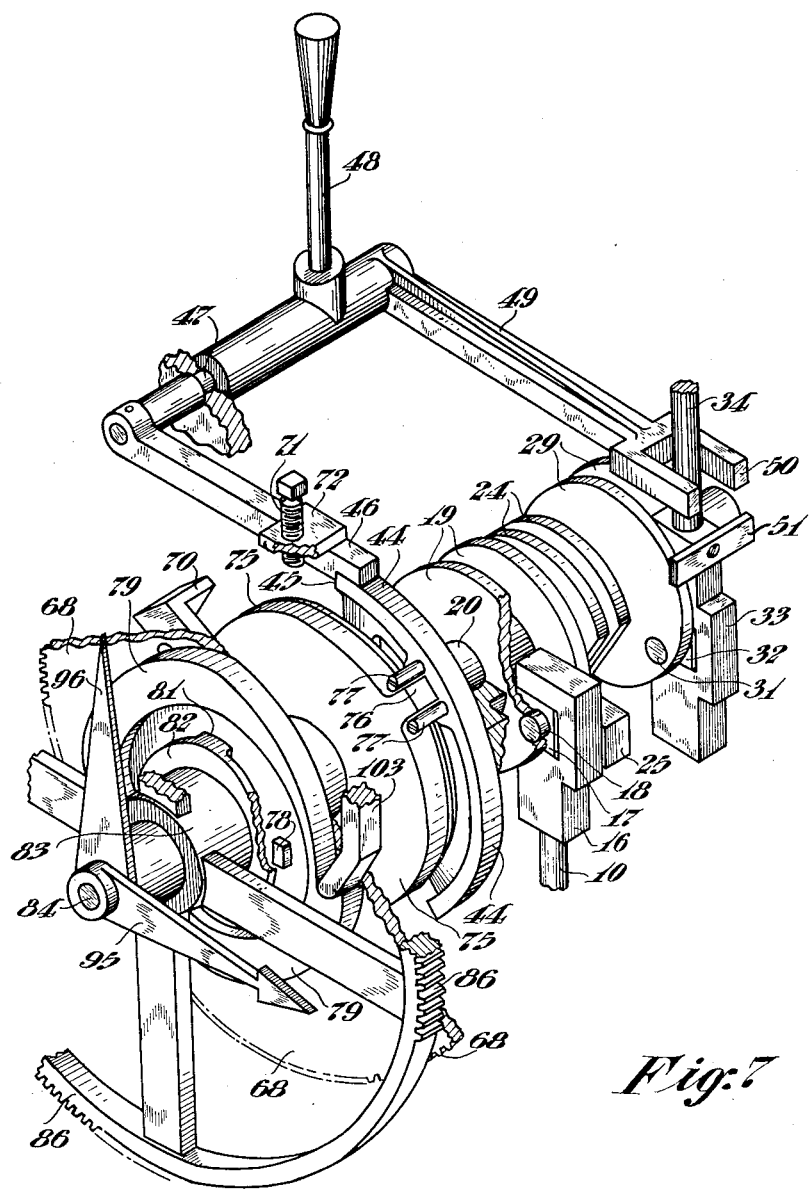
Fig. 7 is a view in isometric projection, of a portion of the apparatus shown in Figs. 1, 2 and 4, parts being broken away.

The shaft 20 is provided at its opposite end with a segment 44 so arranged that one edge thereof will assume a vertical position, as shown in Fig. 7, when the valve 3 is open. The depression of the piston 37 actually causes the segment 44 to rotate somewhat beyond the vertical position so that the segment 44 passes beyond a notch 45 in the free end of an arm 46, allowing that end of the arm 46 to drop slightly.

When the shaft 20 and sleeve 22 are then disengaged by the action of the set screw 27, the segment 44 returns until it is obstructed by the arm 46, and the segment 44 is then held in the position shown in Fig. 7, thus maintaining the valve 3 in the open position.

The arm 46 terminates at its other end in a shaft 47 having a handle 48 at right angles thereto and having also an extension 49 terminating in a yoke 50 that will be engaged and lifted slightly by an arm 51 mounted upon the crosshead 33, when the crosshead 33 subsequently returns to its uppermost position, causing a similar rise of the free end of the arm 46.

It will be apparent that the application of pressure to the top of the cylinder 36 causes the valve 3 to open, and it is held in that position by the arm 46 and the segment 44 while the direct operative connection between the piston 37 and the valve 3 is broken.

If, the valve 3 now being open as shown in Fig. 7, the arm 46 is raised manually by means of the handle 48 and releases the segment 44, the spring 9 will cause the valve 3 to close. Or, should the pressure above the piston 37 be relieved before the valve 3 is closed by other mechanism hereinafter to be described, the spring 42 will raise the crosshead 33 and when the arm 51 then engages and lifts the yoke 50, the arm 46 rises and releases the segment 44, thus allowing the valve 3 to close.

Ordinarily, however, the closing of the valve 3 is effected by the meter 4, and the mechanism for this purpose will now be described.

The segment 44 is provided on one side thereof with a raised wedge or cam 55, so positioned that in the position of the segment 44 corresponding to the closed position of the valve 3, this cam 55 causes a displacement of the free end of a clutch lever 56 pivotally mounted at its opposite end in a swivel 57 and carrying a ratchet clutch member 58, against the action of a spring 59, so that the clutch member 58 is withdrawn from and no longer engages a corresponding clutch member 60.

The clutch member 58 is slidably keyed to a shaft 62 having at its other end a bevel gear 63 that engages a similar bevel gear 64 mounted on the end of the shaft 14.

The clutch member 60 is mounted upon a sleeve 65 that is in turn loosely mounted over one end of the shaft 62, and which carries at its opposite end a pinion 66.

The clutch lever 56 is restrained from upward displacement under a thrust from the cam 55 by a stop 67 forming a part of the housing of the entire device 2.

When the valve 3 is opened and the segment 44 rotates toward the position shown in Fig. 7, the cam 55 is withdrawn from its position under the free end of the clutch lever 56, and the action of the spring 59 causes the clutch members 58 and 60 to engage and operatively connect the shaft 14 and the pinion 66, so that the latter will rotate proportionately to the amount of liquid traversing the meter 4.

The pinion 66 engages a large gear 68 mounted upon a shaft 69 that is coaxial with and adjacent to the shaft 20. The gear 68 carries upon the side adjacent to the segment 44 a lug 69 that performs no function in the present instance and a wedge-shaped member 70, so located that rotation of the gear 68 by the pinion 66 eventually causes the wedge 70 to engage a set screw 71 adjustably mounted in an extension 72 of the arm 46. This engagement of the wedge 70 and the set screw 71 lifts the free end of the arm 46 and the segment 44 is released and then rotates back, as above set forth, closing the valve 3, and also moving the clutch lever 56 so as to cause the disengagement of the clutch members 58 and 60.

It is thus apparent that the clutch members 58 and 60 are engaged only when the valve 3 is open. When the valve 3 is closed, the operative connection between the meter 4 and the gear 68 is broken.

It will further be apparent that the distance the wedge 70 must travel before engaging and lifting the set screw 71 will govern the amount of liquid which traverses the meter 4 during the period during which the valve 3 is open.

Accordingly, I provide means for limiting the travel of the wedge 70 to a predetermined and preselected arc, and also means whereby the device automatically re-sets itself at the conclusion of each period of operation.

The shafts 20 and 69 are connected by means of a clock spring 73, attached at one end by means of a pin 74 to the shaft 69, and at the other end to a housing 75 mounted for rotation on the shaft 69. The housing 75 is provided with a lug 76 that is positioned between a pair of pins 77 inserted in the segment 44.

The effect of the spring 73, when the clutch members 58 and 60 are disengaged, is to cause the gear 68 to rotate back in a direction opposite to that caused by the rotation of the shaft 14 when the clutch members 58 and 60 are engaged. The gear 68 rotates back under action of the spring 73 until a lug 78 on a cam 79 at one end of the shaft 69 meets a lug 81 on a disk 82 forming a part of a sleeve 83 that is rotatably mounted upon an extension 84 of the shaft 69.

The sleeve 83 is provided with a large gear 86 that engages a pinion 87 mounted upon one end of a shaft 88. The gears 86 and 87 are prevented from turning under the pressure exerted between lugs 78 and 81 by the spring 73 by a ratchet bushing 90 secured to the housing of the device. This ratchet connection is ordinarily held in closed position by means of a spring 91 compressed between the bushing 90 and a flange 92 on the shaft 88, but by means of a handle 93 of the shaft 88, the pinion 87 may be moved axially until the ratchet connection is disengaged, and the disc 82 and lug 81 may then be turned into any desired position, when they are locked by releasing the handle 93.

It will be apparent from the above that by adjustment of the handle 93 and the consequent position of the lug 81, the arc of travel of the lug 78 and consequently of the wedge 70, may be set at any desired fraction of one substantially entire revolution. Thus the setting of the gear 86 governs the amount of liquid that will traverse the meter 4 from the time the valve 3 is opened to the time when the valve 3 is automatically closed, and the device 2 may thus be set to deliver a predetermined amount of liquid.

For the purpose of indicating the setting and operation of the device, I provide an arm or indicating hand 95 attached to the end of the extension 84 of the shaft 69, and a setting hand 96 attached to the end of the sleeve 83, and adjacent to the hand 95. I further provide a face 97 that is preferably marked and calibrated in terms of gallons or other fluid volume units, on a suitable scale, as shown.

To set the device to deliver a definite number of gallons of liquid, the handle 93 is depressed and rotated until the hand 96 is opposite the corresponding division of the scale on the face 97. The hand 95 follows the hand 96 to this position. When pressure is exerted upon the cylinder 36, the valve 3 closes and the meter connection is made, the flow of liquid through the meter causing the hand 95 to rotate in a clockwise direction in the view of Fig. 1.

The adjustment of the set screw 71 is such that the valve 3 is released and closed and the meter connection broken when the hand 95 reaches the zero point on the scale on the face 97, and the spring 73 then causes the hand 95 to return to the hand 96 as the device re-sets itself.

Moving the handle 48 or releasing the pressure on the cylinder 36 before the hand 95 reaches the zero position automatically releases and closes the valve 3 and causes the hand 95 to return immediately to the position of the hand 96, breaks the operative connection to the meter 4, and re-sets the device as before.

In the re-setting operation, the inertia of the rotating parts is such that there is a considerable impact upon engagement of the lugs 78 and 81, and to minimize the shock of this impact, I provide the device shown in Figs. 4 and 5.

In this device, a small cylinder 100 is pivotally secured to a plate 101 mounted upon the side of the gear 86. Slidably but snugly fitted therein is a piston 102, to which is rigidly fastened a bent rod 103, the opposite end of which engages the cam 79 under action of springs 104 and 105.

The action of the piston 102 in the cylinder is similar to that of a dash pot, and the return of the cam 79 to the position of engagement of the lugs 78 and 87 is cushioned by the air confined above the piston 102 in the cylinder 100, thus preventing a severe impact and shock at the moment of engagement.

In assembling the device, care is taken to co-ordinate the various parts and to eliminate lost motion, in order that the device may be accurate and rapid in action.

Various changes in the several parts of the device may be made without departing from the spirit of my invention, as will be apparent to those skilled in the art. For example, other valves and meters may be substituted for those illustrated, and various other devices may be substituted for the pressure cylinder, the release mechanism, and the like. However, the form illustrated embodies the various parts and devices which I have found to be most advantageous.

The device of my invention has a particular utility with respect to gas-manufacturing apparatus whether of primary or secondary type. It may be employed to govern the amounts of fluid, such as, for example, enriching oil supplied to a carburetted water-gas set, and is especially advantageous when applied to an automatically controlled set as it renders the operation of the set more completely automatic and accurate than has been possible heretofore. Such an application is illustrated in Fig. 8, and will now be described.

A carburetted water-gas set is illustrated that is of the conventional "hot-valve" type, and consists primarily of a water-gas generator 110, a carburetter 111, a superheater 112 and a tar batter 113. The generator 110 is provided with a grate (not shown) which supports a fuel bed, and a charging opening 114.

During the blast period or "blow," air is introduced from a generator blast line 115 having a valve 116, and passes upward through the fuel bed in the generator 110, raising the temperature of the same. The resultant gas, consisting largely of carbon monoxide and nitrogen, passes through a conduit 117 into the upper part of the carburetter 111, where it is burned by means of secondary air introduced from a carburetter blast pipe 118, having a valve 119.

The resultant hot products of combustion pass downward through the interior of the carburetter 111, through a passage 120 into the superheater 112, upward through the superheater 112, and are allowed to escape through an open stack 122 having a valve 123 held open for that purpose.

During this part of the cycle of operation, the temperatures within the generator, carburetter and superheater are raised sufficiently to allow for the subsequent part of the cycle, known as the "run," in which endothermic reactions occur and the temperatures fall.

The carburetter blast valve 119, the generator blast valve 116, and the stack valves 123 are then closed, and steam is supplied from a steam pipe 124 having a valve 125. The steam now passes through a three-way valve 126 and a conduit 127 into the lower part of the generator 110.

The resultant blue water gas follows the course of the air blast gases through carburetter 111 and superheater 112, and then passes through a conduit 128 into the tar batter 113, and thence through a conduit 129 into the purifying apparatus and mains (not shown). This part of the cycle is known as the "first up-run."

A hot valve 130 in the conduit 117 is then reversed, closing conduit 117 and opening a conduit 132 leading from the lower part of the generator 110 to the upper part of the carburetter 111. Reversal of the hot valve 130 also reverses the three-way valve 126, and steam now enters the generator 110 through a conduit 133, passing downward through the generator 110, then through the conduit 132 to the carburetter 111, and through the rest of the set as in the up-run. This part of the cycle is known as the "down-run."

After a short time, the hot valve 130 and three-way valve 126 are again reversed, a "second up-run" is performed, and the cycle is complete and is then repeated.

The various valves 116, 119, 123, 125 and 130 are provided with hydraulic actuating cylinders 140, 141, 142, 143 and 144, respectively. The cylinders 140, 141, 142 and 144 are provided with pairs of hydraulic pressure and relief conduits 146 and 147, 148 and 149, 150 and 151, and 152 and 153, respectively, that communicate at their other ends in appropriately placed ports in the wall of a master control cylinder 160.

In the present instance, the hydraulic cylinder 143 of the steam valve 125 is connected by means of a pair of hydraulic pressure and relief conduits 154 and 155 extending from the top and bottom thereof to the conduits 150 and 151, respectively, that are connected to the hydraulic cylinder 142 of the stack valve 123, so that as the stack valve 123 is closed, the steam valve 125 is opened, and vice versa.

Within the cylinder 160 is slidably situated a more or less spool-shaped piston valve 161, that is reciprocated through successive up-and-down strokes by means of a timing device 162, the details of which need not be shown.

Midway of the travel of the piston valve 161 there is located in the side of the cylinder 160 a port communicating with a hydraulic pressure conduit 163. The cylinder 160 is drained through a low-pressure conduit 164.

The various pairs of hydraulic conduits, for example, conduits 146 and 147, enter the cylinder 160 through ports that are spaced a distance apart equal to the distance between end flanges of the piston valve 161. As the piston valve 161 moves up or down, it passes the two ports of any unit pair of hydraulic conduits simultaneously, and effects a reversal of the corresponding valve, by reversing the pressure conditions in the corresponding operating cylinder.

In Fig. 8, the set is illustrated as during the air blow period. With the piston valve 161 at the top of its stroke, conduits 146, 148, 150 and 152 are in communication with the high-pressure conduit 163, and conduits 147, 149, 151 and 153 are in communication with the drain conduit 164. Accordingly, the generator blast valve 116, the carburetter blast valve 119 and the stack valve 123 are open, the steam valve 125 is closed, and the hot valve 130 is in the normal position.

As the piston valve 161 moves downward, it first passes the ports corresponding to conduits 148 and 149, and closes the carburetter blast valve 119. Passing the ports of conduits 146 and 147, it closes the generator blast valve 116. The valve 161 next encounters the ports of conduits 150 and 151, and so closes the stack valve 123, and also, through conduits 154 and 155, opens the steam valve 125, starting a run and more particularly an uprun.

The steam run continues until, on the succeeding upstroke of the piston valve 161, the ports of conduits 150 and 151 are encountered, and the stack valve 123 is opened and the steam valve 125 is closed. Near the end of the down-stroke, by simultaneous operation of the hot valve 130 and the three-way valve 126, a down-run is performed. It is followed by another up-run, during the ensuing up-stroke. During the entire run period, including both the up-runs and the down-run, the conduit 151 is in communication with the conduit 163 and contains liquid under pressure.

The production of carburetted water gas, as the name implies, involves enrichment of the blue water gas made in the generator, by carburetting it with oil or other enriching agent in the carburetter and superheater. The present invention makes it possible to automatically control the amount of oil admitted to the carburetter for carburetting the gas.

The oil for carburetion is obtained from a suitable source of supply 170 under pressure, and is conducted to the carburetter 112 through a conduit 171 and a water-cooled spray 172 in the top of the carburetter 111.

The valve 3 and meter 4 of the device 2 are inserted in the conduit 171, and valves 173 and 174 are provided on either side, also a by-pass conduit 175 having a valve 176 that is normally closed.

The pressure cylinder 36 is conveniently connected to the conduit 151 through a conduit 177 that corresponds to conduit 39 of Fig. 1.

The valves 173 and 174 are set to give a proper rate of flow when the valve 3 is open, and need not be changed thereafter unless pressure conditions vary. The device 2 is set to deliver the desired amount of oil.

The arrangement is such that as the stack valve 123 is closed and the steam valve 125 is opened, thus inaugurating a run, pressure is applied to the cylinder 36, thus opening the valve 3, which is held open independently of the cylinder 36 until the amount of oil for which the device is set is delivered to the carburetter 111, when the valve 3 is automatically closed, and carburetion ceases.

It may happen that the device 2 is set to deliver a quantity of oil too great to be entirely delivered during the period of the steam run. In this event, the reversal of pressure conditions in the conduits 150 and 151, which marks the end of the run, relieves the pressure in the cylinder 36, and this automatically closes the valve 3, although the predetermined amount of oil has not been delivered to the carburetter 111. This is necessary because the spraying of oil into the carburetter 111 during the ensuing air blow would cause wasteful and dangerous combustion to take place.

It will be noted that reversal of the direction of flow of steam through the fuel bed of the generator 110 does not affect the supply of oil to the carburetter 111, as this set is of the hot-valve type wherein both up-run and down-run gases traverse the carburetter 111.

While I have described the application of my device to a carburetted water-gas set of the hot-valve type, operated by an hydraulic control device, it may obviously be readily adapted to the requirements of other types of sets and other control devices.

It will be noted that my invention provides apparatus for automatically supplying a predetermined amount of fluid to a point or points at predetermined intervals that is effective and accurate, advantageous with respect to the prior art, and of especial utility in the manufacture of gas.

Various other modifications and applications of the device or devices of my invention are possible, and my invention is accordingly not limited to the specific applications and embodiments described herein, except as it may be limited by the scope of the claims hereinafter made.

I claim as my invention:—

1. In an apparatus for manufacturing water gas including a generator, carbureter and superheater: the combination of conduits for supplying fluids to the several parts of the apparatus and appropriate valves in said conduits for controlling the supply of fluids therethrough, an automatic timing device for operating said valves in predetermined sequence, a meter in one of said conduits and adapted to measure the passage of fluid therethrough, an operative connection whereby said timing device periodically opens the valve in said conduit, and automatic means responsive to the amount of fluid passing through said meter for closing said valve when a predetermined amount of fluid has passed through the meter.

2. In combination, gas-manufacturing apparatus including conduits for supplying fluids to the several parts thereof and appropriate valves therein for controlling the supply of fluids therethrough, an automatic timing device for operating said valves in predetermined sequence, a meter in one of said conduits and adapted to measure the passage of fluid therethrough, an operative connection whereby said timing device periodically opens the valve in said conduit, a stop for holding the valve open, and means operated by the meter for disengaging said stop and allowing the valve to close when a predetermined amount of fluid has passed through the meter.

3. In combination, gas-manufacturing apparatus including conduits for supplying fluids to the several parts thereof and appropriate valves therein for controlling the supply of fluids therethrough, an automatic timing device for operating said valves in predetermined sequence, a meter in one of said conduits, a valve in said conduit, an operative connection whereby said timing device periodically opens the valve in said conduit, a stop for holding the valve open, and means independent of said timing device and responsive to the amount of fluid passing through said meter that is effective to disengage said stop and to allow the valve to close when a predetermined amount of fluid has passed through the meter.

4. In combination, gas-manufacturing apparatus including conduits for supplying fluids to the several parts thereof and appropriate valve mechanisms therein, an automatic control device for sending impulses to said valve mechanisms to operate them in predetermined sequence, a meter located in one of said conduits, a valve in said conduit, means for periodically conveying an impulse from said control device to the valve in said conduit to open said valve, and means independent of said control device and responsive to the amount of fluid passing through said meter for holding said valve open and for closing it when a predetermined amount of fluid has passed through said meter.

5. In combination, gas-manufacturing apparatus including conduits for supplying fluids to the several parts thereof and appropriate valve mechanisms therein, an automatic control device for sending impulses to said valve mechanisms to operate them in predetermined sequence, a meter located in one of said conduits, a valve in said conduit, means for periodically conveying an impulse from said control device to the valve in said conduit to open said valve, means independent of said control device for holding said valve open and means operated by said meter for releasing the valve and allowing it to close when a predetermined amount of fluid has passed through said meter.

6. In combination, a carburetted water-gas set including a generator, a carburetter, and a superheater, an oil spray located in said carburetter, a conduit for conducting oil to said spray, a valve located in said conduit, a meter located in said conduit, a timing device for periodically controlling said valve in accordance with the operating requirements of the water-gas set, and a device operated by said meter and adapted to close said valve when a predetermined amount of oil has passed through said meter.

7. In combination, a carburetted water-gas set including a generator, a carburetter, and a superheater, a plurality of conduits for supplying air and steam to the various parts of the water-gas set, having corresponding valves therein, valves for varying the direction of flow through the set, an automatic control device for operating said valves in predetermined sequence to perform a succession of water-gas operating cycles, a conduit for supplying an enriching fluid to the carburetter, a valve in said conduit, a meter in said conduit, means for conveying periodic impulses from said control device in accordance with the operating cycle to open said valve to allow enriching fluid to flow to the carburetter, and means operated by said meter and responsive to the amount of fluid passing through the same for closing said valve and interrupting the flow of enriching fluid when a predetermined amount thereof has been introduced into said carburetter.

8. In combination, a carburetted water-gas set including a generator, a carburetter and a superheater, a plurality of conduits for supplying air and steam to the various parts of the water-gas set, having corresponding valves therein, valves for varying the direction of flow through the set, an automatic control device for operating said valves in predetermined sequence to perform a succession of water-gas operating cycles, a conduit for supplying an enriching fluid to the carburetter, a valve in said conduit, a meter in said conduit, means for conveying periodic impulses from said control device in accordance with the operating cycle to open said valve to allow enriching fluid to flow to the carburetter, and means operated by said meter independently of said control device and responsive to the amount of fluid passing through said meter for closing said valve and interrupting the flow of enriching fluid when a predetermined amount thereof has been introduced into said carburetter.

9. In combination, a carburetted water-gas set including a generator, a carburetter and a superheater, a plurality of conduits for supplying air and steam to the various parts of the water-gas set, having corresponding valves therein, valves for varying the flow through the set, a conduit for supplying oil to the carburetter, a valve in said conduit, an automatic device for opening said valve to permit the flow of oil to the carburetter when water gas is passing therethrough, automatic means responsive to the amount of enriching fluid passing through said conduit for closing said valve when a predetermined amount of oil has entered the carburetter, and independent automatic means for closing said valve when water gas ceases to pass through the carburetter.

10. Apparatus for manufacturing carburetted gas which comprises conduits and valves for supplying gas-making fluids thereto including a conduit and valve for the supply of enriching fluid to said carburetter, said valve being biased toward its closed position, automatic control mechanism for operating said valves in predetermined sequence to perform a series of gas-making cycles, each of which includes an enriching period in which gas passes through said carburetter for enrichment therein, means operated by said controlling mechanism at the commencement of said enriching period effective to open said valve to admit enriching fluid to said carburetter, a detent adapted to hold said valve open, means operated by said control mechanism to release said detent at the end of the enriching period, and means responsive to the amount of enriching fluid passing through said conduit to release said detent and close said valve when a predetermined amount of fluid passes through said conduit prior to the end of said enriching period.

11. In an apparatus for manufacturing water gas, including a generator, carbureter and superheater: the combination of a conduit for conducting oil to said apparatus, a valve located in said conduit, a meter in said conduit, means for opening said valve to admit oil to the apparatus, and automatic means responsive to the amount of oil passing through said meter for closing said valve and interrupting the supply of oil when a predetermined amount thereof has passed through said meter.

12. In apparatus for manufacturing water gas, including a generator, carbureter and superheater: the combination of a source of oil supply, a conduit for conducting oil therefrom to said apparatus, a valve located in said conduit, a meter in said conduit, means for opening said valve to admit oil to the gas-manufacturing apparatus, an automatic timing device for periodically opening said valve to admit oil to the gas-manufacturing apparatus in accordance with the requirements thereof, and automatic means responsive to the amount of oil passing through said meter for closing said valve and interrupting the supply of oil when a predetermined amount thereof has passed through said meter.

WALTER A. BARR.